United States Patent [19]
Waske

[11] 3,918,194
[45] Nov. 11, 1975

[54] TRAP CLOSURE

[76] Inventor: George F. Waske, Worth, Mo. 64499

[22] Filed: Nov. 29, 1974

[21] Appl. No.: 528,281

[52] U.S. Cl. .................................................. 43/61
[51] Int. Cl.[2] ...................................... A01M 23/20
[58] Field of Search .............. 43/61, 85, 86, 65, 67, 43/77

[56] References Cited
UNITED STATES PATENTS

| 377,589 | 2/1888 | Warner | 43/61 |
| 1,451,720 | 4/1923 | Swank | 43/61 |
| 1,941,242 | 12/1933 | Bechtel et al. | 43/65 |
| 2,437,020 | 3/1948 | Ford | 43/61 |
| 3,729,852 | 5/1973 | Holmes | 43/61 |

Primary Examiner—Warner H. Camp
Attorney, Agent, or Firm—Fishburn, Gold & Litman

[57] ABSTRACT

A trap closure device for use in combination with an open ended container or cage, for trapping animals alive, comprises a plate having an access opening therethrough for animal entry and first and second door members pivotally mounted on the plate, operable to resiliently overlap the access opening in response to actuation by the animal of an over-center trigger latch on the container side of the plate. A slot is formed between the plate and an offset portion of the plate for receiving the ends of the door members overlapping the access opening. Suitable slots are provided on the peripheral edges of the plate for receiving and aligning the rim of the open ended container.

10 Claims, 5 Drawing Figures

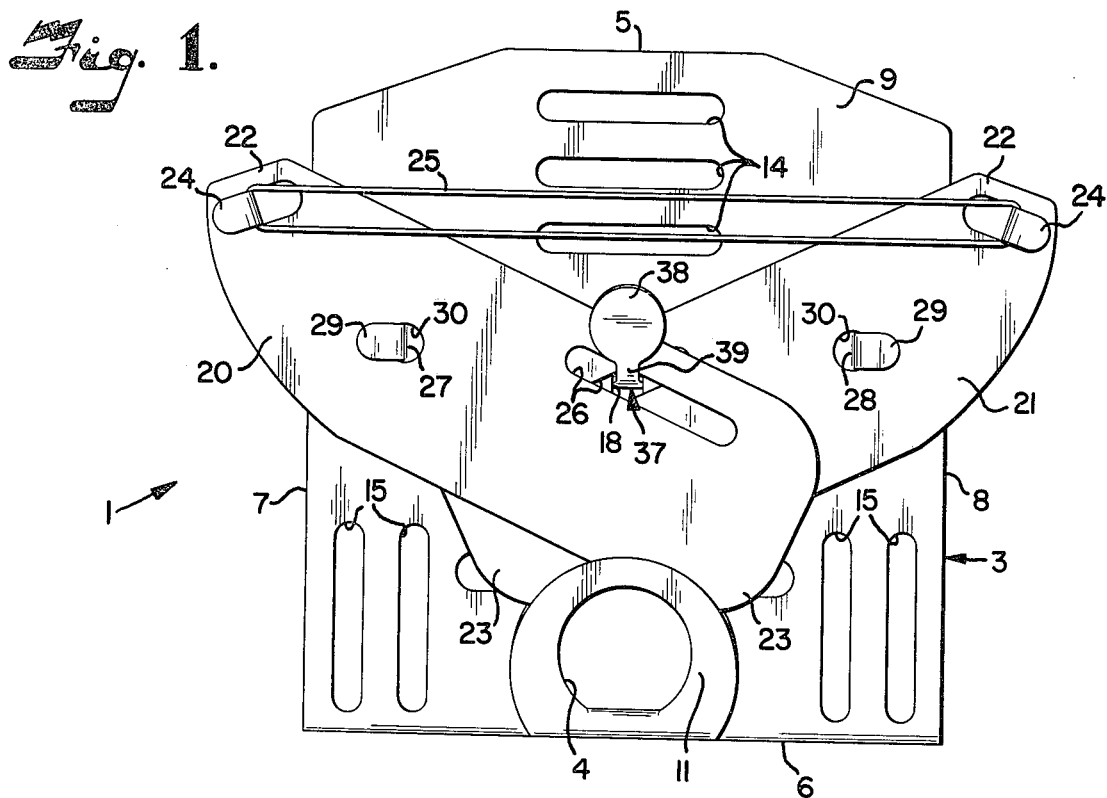
Fig. 1.
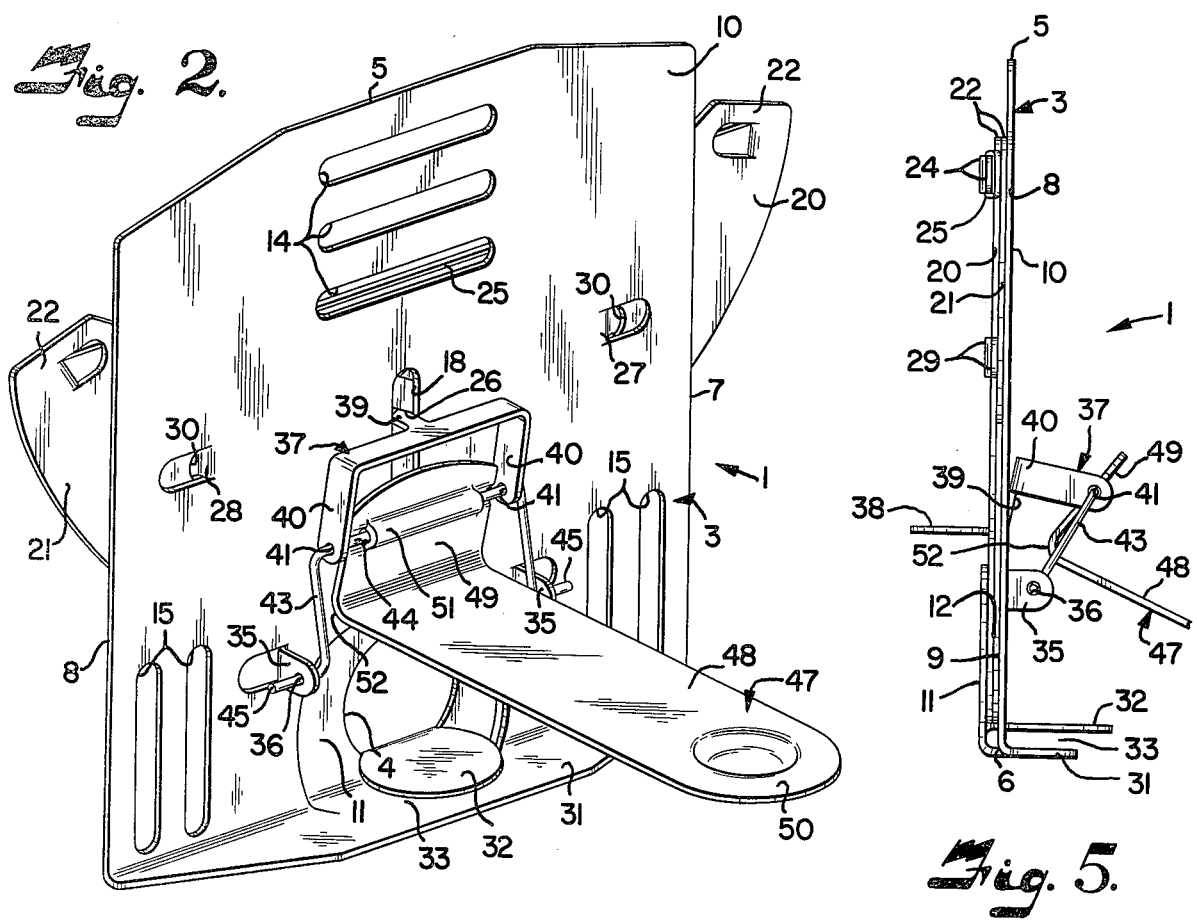
Fig. 2.
Fig. 5.

TRAP CLOSURE

The present invention relates to trap closure devices of the kind intended for use with open ended containers for live trapping of animals, particularly mice. Past devices have been constructed of parts requiring expensive manufacturing processes, and often have relied upon complex trigger mechanisms that do not set positively, may be inadvertently released from the outside, and are difficult to set from the outside. In some cases, the closure members do not close positively, creating the possibility of the animal escaping. In other cases, the means of attaching the closure to the container requires a specific size or shape of container.

The present invention overcomes these problems while providing an apparatus suitable for fabrication from inexpensive materials and which requires a minimum of manufacturing processes.

The principal objects of the present invention are to provide an improved trap closure, for use in combination with an open ended container, for trapping animals alive; to provide a structure of such design that it may be used in various proportions to trap animals of various types and sizes; to provide such an apparatus that securely traps the animal; to provide such an apparatus with a trigger mechanism that is easy to set, positive in holding, and effective in operation; to provide such an apparatus that may be easily aligned with and attached to a variety of open ended containers; to provide such an apparatus that may be folded to a convenient size for packaging and storing; to provide such an apparatus that is strong and durable yet constructed of inexpensive materials; to provide such an apparatus with a minimal number of parts that are economical to manufacture and easy to assemble; and to provide such an apparatus that is particularly well adapted for its intended purpose.

Other objects and advantages of this invention will become apparent from the following description taken in connection with the accompanying drawings wherein are set forth by way of illustration and example certain embodiments of this invention.

FIG. 1 is a front elevational view of the trap closure with the doors shown in an open or trap-ready position.

FIG. 2 is a rear perspective view with elements of the trigger mechanism shown in trap-ready position.

FIG. 5 is a fragmentary side elevational view similar to FIG. 3, showing the over-center trigger mechanism in a released or trap-closed position.

Figure 3:
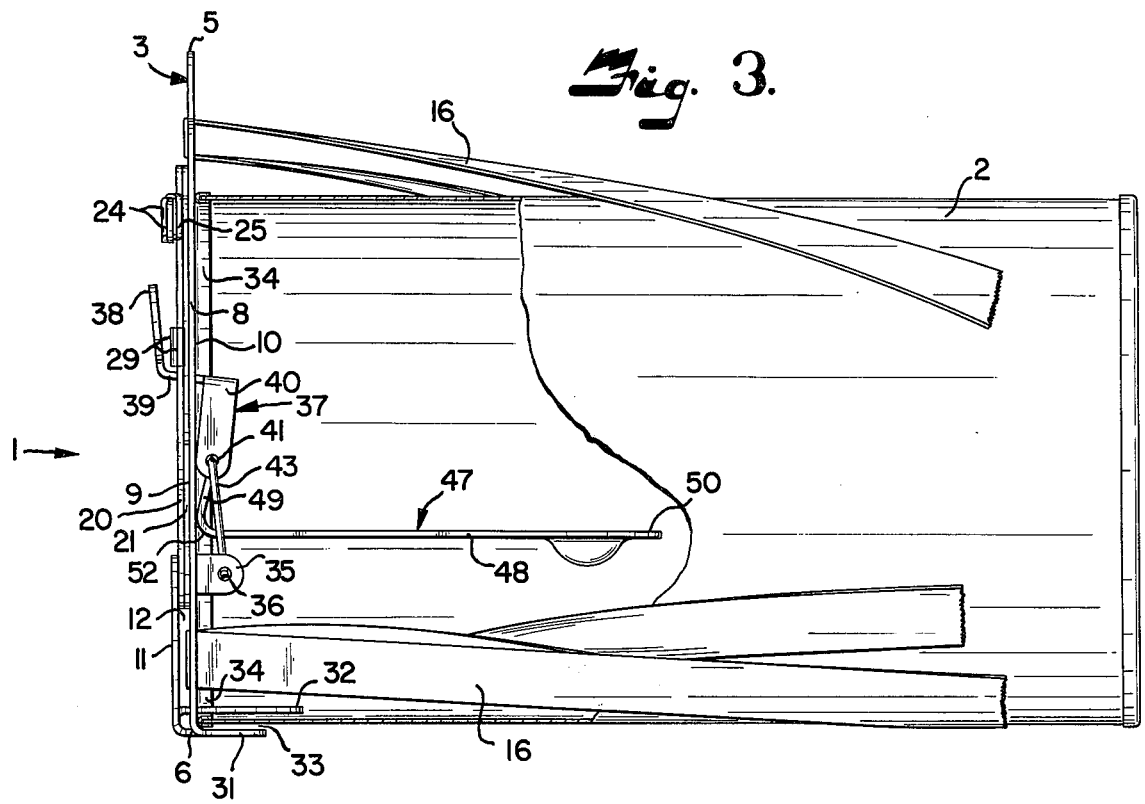
FIG. 3 is a side elevational view showing the trap closure attached to a typical container, with portions of the container broken away to show the over-center trigger mechanism in a trap-ready position.
Figure 4:
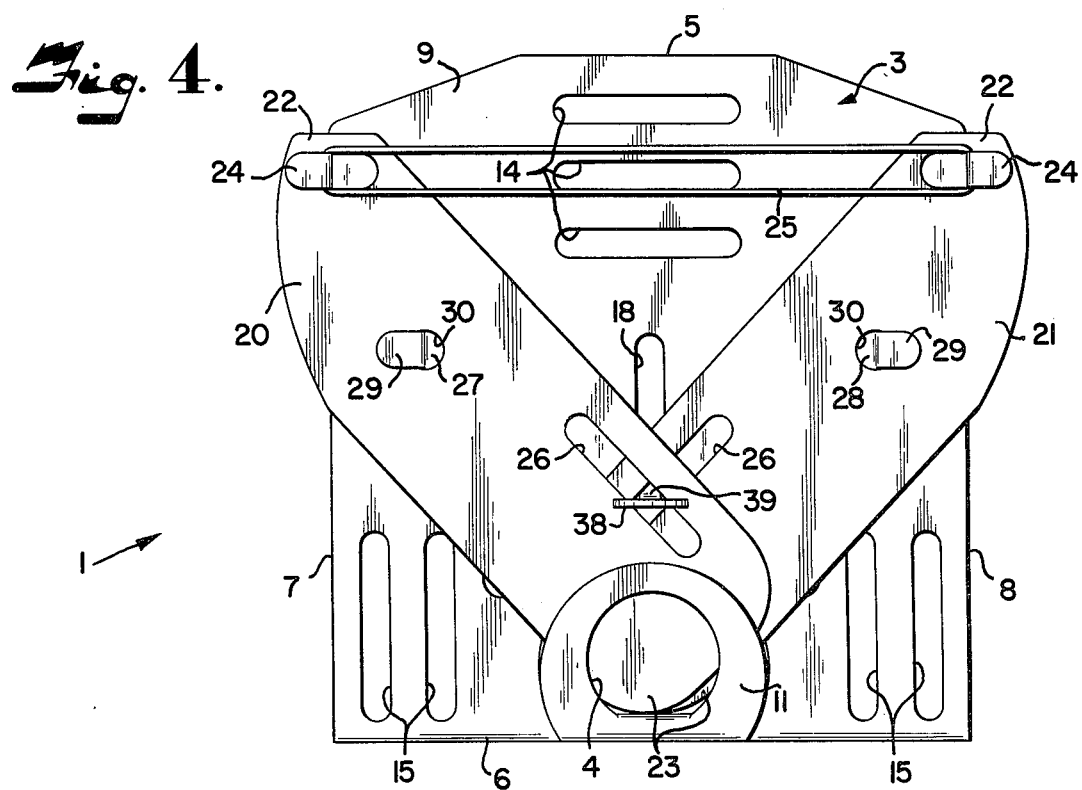
FIG. 4 is a front elevational view similar to FIG. 1 showing the doors in a released or trap-closed condition.

Referring to the drawings more in detail:

The reference numeral 1 generally designates a trap closure for use in combination with a hollow container 2 which may take the form of an empty food can, an open ended cage or other suitable receptacle, depending on the nature of the animal sought. In the embodiment shown, the trap closure 1 comprises a plate 3 having an access opening 4 therethrough. The plate 3 is substantially planar and may be of any suitable material, in this example, easily formable sheet metal. The plate 3 is generally rectangular having a top edge 5, a bottom edge 6, opposed side edges respectively 7 and 8, a front face 9 and a back face 10. Centered and located near bottom edge 6 is a door retainer 11 which is offset forwardly from the front face 9 and forms, with the plate 3, a slot 12 (FIG. 3) for a purpose later described. Located in the plate 3 above the door retainer 11 is an elongated, vertical toggle guide slot 18 also for a purpose later described.

The plate 3 includes a plurality of elongated, parallel, horizontal slots 14 located adjacent the top edge 5 and a plurality of elongated, parallel, vertical slots 15 located adjacent the lower part of respective side edges 7 and 8. A tensile strip 16 is passed through slots 14 and 15 in such a manner as to attach the plate 3 to the container 2 and may take the form of a rubber band, a length of adhesive tape, string, etc. Selecting specific slots 14 and 15 permits attachment of the trap closure 1 to containers of various sizes within the limits of plate 3 dimensions.

First and second planar, elongated door members, respectively designated 20 and 21 are pivotally mounted on the plate front face 9 and are overlapped adjacent the lower ends 23 thereof. Anchors 24 are located adjacent the upper ends 22 of door members 20 and 21 and receive thereon a resilient tensile device 25, urging the door members 20 and 21 to pivot toward positions blocking access opening 4 and within the slot 12. In the embodiment shown, the resilient tensile device 25 is a rubber band, and anchors 24 are offset ears integral with the door members 20 and 21. The door retainer 11 forming the slot 12 is substantially planar and prevents the door lower ends 23 from being pushed away from the plate front face 9 by the animal attempting to escape or in rough handling by the user. In the structure shown, the access opening 4 is formed in the door retainer 11.

Door members 20 and 21 pivot respectively about laterally spaced locations 27 and 28. In the structure illustrated, lugs 29, integral with the plate 3 and offset from the front face 9, are pivotally engaged through door member apertures 30. Elongated, longitudinal toggle guide slots 26 are formed in each of the door members 20 and 21 adjacent the area of mutual overlap, for a purpose later described.

Projecting rearwardly of the plate back face 10 are flange 31 and slot-forming tongue 32, which cooperate to form a rim receiving slot 33. When the trap closure 1 is secured against the container 2, the container rim 34 is preferably inserted into the slot 33 for producing alignment with the horizontal and vertical slots 14 and 15 and between the access opening 4 and open end of the container 2. In the structure shown, flange 31 and slot forming tongue 32 are integral with the plate 3. When the container 2 is cylindrical, flange 31 has the added purpose of preventing rolling on the surface supporting the assembly.

Laterally spaced parallel lugs 35, having transversely aligned apertures 36, project rearwardly of the plate back face 10. In the structure illustrated, the lugs 35 are integral with plate 3 and located generally equally spaced on either side of the vertical center line of plate 3 above the access opening 4. Opposite ends 45 of a crank 43 are pivotally received in the apertures 36 for swinging movement of a central shaft portion 44 about a horizontal axis parallel to the plane of plate 3. A toggle member 37, having spaced parallel legs 40 with mutually aligned apertures 41 therein, is hingedly mounted on the crank 43, with the apertures 41 pivotally engaging the extremities of the shaft portion 44, FIG. 2. The toggle member 37, preferably formed of sheet metal, has a shank 39 which projects through the plate guide slot 18 overlapping door member slots 26 terminating in a setting tab 38. Upward force applied to the setting tab 38 causes the shank portion 39 to slidably engage the boundary lines forming the overlapping slots 26, thereby urging the door members 20 and 21 to pivot against the resilient force of the tensile device 25 and move same from positions blocking access opening 4 to open positions. The open positions are retained by the over-center cooperation of toggle member 37, crank member 43, and the plate back face 10. In this condition the trap is set and ready for use.

A generally L-shaped trigger member 47 comprises a crank lever portion 49, having hinge forming means 51 thereon, and a cantilever portion 48 terminating in a free bait-receiving end 50. In the structure shown, crank lever portion 49 and cantilever portion 48 are substantially planar and roughly mutually perpendicular, joining at a heel 52. The trigger member 47 is mounted with the hinge forming means 51 rotatably received on the crank shaft portion 44 with the cantilever portion 48 extending rearward of the back face 10. When the trap has been set, a downward force applied to the bait-receiving end 50 is transferred through the heel 52 to the crank lever portion 49 as a rearward force, whereby the combination of crank 43 and toggle 37 is rotated out of its over-center lock, thereby releasing door members 20 and 21 for rotation about their respective pivots, at the urgence of tensile member 25, to a position blocking access opening 4.

When it is desirable to trap an animal using the trap closure 1, any suitable open-ended container 2, such as a discarded tin can or jar, is selected. Appropriate bait is attached to the bait-receiving end 50 of trigger member 47. The trap closure 1 is then placed over the open end of the container 2 with container rim 34 received in slot 33, and a tensile strip 16, such as a piece of adhesive tape, is passed through slots 14 and 15 in such a manner as to secure the mutual engagement. An upward force is then applied to the setting tab 38 causing door members 20 and 21 to assume a open position. In this condition the trap is baited and set, ready for operational use.

An animal in search of food enters the trap closure 1 through the access opening 4, and in attempting to sample the bait, applies a force to bait-receiving end 50 of the trigger 47, which force is transferred through heel 52 to crank lever portion 49. This action causes rotation of the crank 43 and toggle 37 therewith out of over-center condition, whereby the shank 39 is released from engagement with the upper boundary lines of overlapping slots 26. This allows the door members to rotate, urged by the tensile device 25, to a position in which the lower ends 23 are further received in slot 12 and block the access opening 4. The animal becomes securely trapped in the container, and may be disposed of as desired.

It is to be understood that while certain embodiments of this invention have been illustrated and described, it is not to be limited thereto except insofar as such limitations are included in the following claims.

What I claim and desire to secure by Letters Patent is:

1. A trap closure for use in combination with a hollow container having a rim defining an entrance opening thereinto comprising:
   a. a plate having a front face and a back face and an access opening therethrough, said plate being adapted to be secured over said entrance opening with said back face directed into said container and said access opening communicating with said entrance opening;
   b. first and second overlapping door members adjacent said front face and respectively having one end adapted to block said access opening and an other end, an anchoring device associated with each of said other ends;
   c. said door members respectively being pivotally mounted on said plate at spaced pivot points located generally centrally between said door member ends and positioned on said plate spaced from said access opening and from each other, whereby said door member one ends overlap said access opening when said door member other ends are displaced toward each other;
   d. a resilient tensile member connected to said door member anchoring devices and urging said door member other ends toward each other;
   e. trigger latch means mounted on said plate and located adjacent said back face and normally retaining said door member other ends spaced apart a distance sufficient to permit passage through said access opening, said trigger latch means being adapted to release said door members upon triggering, whereby said one ends overlap said access opening, and
   f. trap setting means movably engaging and guiding said first and second door members and operable to simultaneously rotate said first and second door members about said spaced pivot points.

2. The trap closure as set forth in claim 1 wherein:
   a. said door members are planar,
   b. said plate includes an offset portion forming with said plate a slot extending parallel to said door members;
   c. said slot being positioned to receive said one ends when said other ends are displaced toward each other and maintain said door members in the plane in which they are mounted.

3. A trap closure as set forth in claim 2 wherein said offset portion is integral with said plate.

4. A trap closure as set forth in claim 1 wherein said resilient tensile member is a rubber band stretched between and secured to said door member anchoring devices.

5. A trap closure as set forth in claim 1 wherein said pivot points comprise holes in said door members located intermediate respective door members ends.

6. A trap closure as set forth in claim 1 wherein said pivot points positioned on said plate comprise integral ears offset from said plate.

7. A trap closure for use in combination with a hollow container having a rim defining an entrance opening thereinto comprising:
   a. a plate having a front face and a back face and an access opening therethrough, said plate being adapted to be secured over said entrance opening with said back face directed into said container and said access opening communicating with said entrance opening;

b. first and second overlapping door members adjacent said front face and respectively having one end adapted to block said access opening and an other end, an anchoring device associated with each of said other ends;

c. said door members respectively being pivotally mounted on said plate at pivot points located between said door member ends and positioned on said plate spaced from said access opening and from each other, whereby said door member one ends overlap said access opening when said door member other ends are displaced toward each other;

d. a resilient tensile member connected to said door member anchoring devices and urging said door member other ends toward each other;

e. trigger latch means mounted on said plate and located adjacent said back face and normally retaining said door member other ends spaced apart a distance sufficient to permit passage through said access opening, said trigger latch means being adapted to release said door members upon triggering, whereby said one ends overlap said access opening;

f. said trigger latch means including spaced parallel lugs having aligned holes, said lugs projecting rearwardly from the back face of said plate;

g. a crank member having opposite ends pivotally mounted in said lug holes and having a center shaft portion spaced radially from said opposite ends;

h. an elongated slot in said plate, elongated overlapping slots in said door members, i. a toggle member hingedly mounted on said center shaft portion and extending through said plate slot and said door member slots, j. said toggle member being adapted to drive said door members to a cocked position permitting passage through said access opening and acting in over-center cooperation with said crank member to releasably hold said door members in said cocked position; and k. a trigger member comprising a cantilever portion and crank rotating portion, said trigger member being hingedly mounted on said center shaft portion with said cantilever portion extending rearwardly of said back face and having a free end adapted to receive bait, said crank rotating portion being operable to rotate said crank in response to downward force applied to said free end.

8. In a trap closure comprising a plate having an access opening and adapted for use in combination with hollow containers of varying size, said plate having a top edge, a bottom edge and opposite side edges, a. a pair of planar door members mounted on said plate and movable into mutually overlapping blockage of said opening upon actuation of said trap, and b. a plurality of slots located respectively adjacent said top edge and opposite side edges;

c. said slots being adapted to receive therethrough a tensile strip for attaching said plate to said varying size container.

9. In a trap closure for use in combination with hollow containers having a rim defining various size entrance openings thereinto, a. said trap closure being generally planar and having a lower edge and front and back face and at least one closure door, means for removably securing a selected one of said containers in contact with said back face, b. an animal access opening through said closure and closable by said door and located adjacent said lower edge, said animal access opening being substantially smaller than said entrance opening, c. a pair of spaced lips extending rearwardly from said back face adjacent said lower edge and forming a slot adapted to receive said rim therein, said securing means cooperating with said slot to retain said rim in said slot, said slot being located adjacent said animal access opening whereby said animal access opening overlaps said entrance opening regardless of the relative difference in size.

10. In a trap closure comprising a plate having an access opening and at least one door member movable into access opening blocking position, the improvement comprising;

a. an integral offset portion formed from said plate, b. said offset portion having substantially the entire access opening therethrough, c. said offset portion also defining a slot in cooperation with said plate, said door member being movably mounted on said plate for movement within said slot from a position clearing the opening to a position closing the opening, whereby said door member is guided in said slot during its substantially entire closing movement.

* * * * *